(12) United States Patent
Wu et al.

(10) Patent No.: US 9,198,243 B2
(45) Date of Patent: Nov. 24, 2015

(54) LED DRIVER CIRCUIT FOR SUPPLYING TRIAC HOLDING CURRENT BY USING CONTROLLABLE CURRENT SOURCE

(71) Applicant: UNITY OPTO TECHNOLOGY CO., LTD., New Taipei (TW)

(72) Inventors: Chih-Hsien Wu, New Taipei (TW); Wei Chang, New Taipei (TW); Kai-Cheng Chuang, New Taipei (TW); Shao-Wei Chiu, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 14/200,309

(22) Filed: Mar. 7, 2014

(65) Prior Publication Data

US 2015/0173140 A1     Jun. 18, 2015

(30) Foreign Application Priority Data

Dec. 17, 2013   (TW) .............................. 102223801 U

(51) Int. Cl.
*H05B 41/34* (2006.01)
*H05B 37/02* (2006.01)
*H05B 33/08* (2006.01)

(52) U.S. Cl.
CPC ........ *H05B 33/0815* (2013.01); *H05B 33/0845* (2013.01); *Y02B 20/347* (2013.01)

(58) Field of Classification Search
CPC .. H05B 41/34; H05B 33/0803; H05B 37/029; B23K 11/248
USPC ....................... 315/209 R, 291, 307, 308, 360
See application file for complete search history.

(56) References Cited

U.S. PATENT DOCUMENTS

| | | | |
|---|---|---|---|
| 8,525,438 B1* | 9/2013 | Cheung et al. ................. | 315/291 |
| 2011/0285301 A1* | 11/2011 | Kuang et al. ............... | 315/200 R |
| 2012/0319605 A1* | 12/2012 | Choi et al. ..................... | 315/201 |
| 2013/0241427 A1* | 9/2013 | Kesterson et al. ............ | 315/210 |
| 2014/0077713 A1* | 3/2014 | Otake et al. ............... | 315/200 R |
| 2014/0132172 A1* | 5/2014 | Zhu et al. ...................... | 315/210 |

* cited by examiner

*Primary Examiner* — Daniel D Chang
(74) *Attorney, Agent, or Firm* — Rosenberg, Klein & Lee

(57) ABSTRACT

An LED driver circuit for supplying a TRIAC holding current by using a controllable current source has a single-stage power factor correction circuit architecture, and the circuit receives an input voltage received by a conversion module of the controllable current source to form an operating current for driving an LED light source to emit light and monitoring the change of the input voltage by a control chip, and adopts a switching method of a fixed cut-off time of a switch unit, so that the controllable current source outputs a constant operating current in a standard peak value to achieve the constant current status during the operation of the LED light source while assuring the operating current is always greater than a holding current required by the TRIAC element when the TRIAC element is conducted.

5 Claims, 5 Drawing Sheets

LED DRIVER CIRCUIT FOR SUPPLYING TRIAC HOLDING CURRENT BY USING CONTROLLABLE CURRENT SOURCE

CROSS-REFERENCE TO RELATED APPLICATIONS

This non-provisional application claims priority under 35 U.S.C. §119(a) on Patent Application No(s). 102223801 filed in Taiwan, R.O.C. on Dec. 17, 2013, the entire contents of which are hereby incorporated by reference.

BACKGROUND OF THE INVENTION

1. Field of the Invention

The present invention relates to the technical field of a power conversion circuit for light emitting diode (LED) illumination equipments, and more particularly to an LED driver circuit for supplying a triode for alternating current (TRIAC) holding current by using a controllable current source to assure that a TRIAC component obtains a current greater than the current required for the operation of the TRIAC component when the TRIAC component is conducted regardless of the light emitting brightness of an LED light source, so as to enhance the operating stability and dimming accuracy.

2. Description of the Related Art

In general, most of the control circuits for LED lamps employ a switch such as a silicon controlled rectifier (SCR) TRIAC to control different phases in order to change the voltage phase of an input current, and a driving voltage outputted by the control circuit is changed by the method of switching the conduction angle of the voltage phase to adjust the driving current passing into the LED light sources and achieve the dimming effect. Although the dimming devices of this sort have the advantages of simple control and easy installation, the voltage waveform of the input power is situated at a distortion status to cause the problems of a low PF and an increased harmonic voltage. From the current/voltage (I/V) characteristic curve of the LED, the LED is a nonlinear component; in other words, the voltage and the current are not directly proportional to each other. Therefore, the dimming effect of the aforementioned dimming method is inaccurate which results in unnecessary power consumption due to the inconsistent driving voltage and driving current. Under the influence of the characteristics the TRIAC element, if the operating voltage passing into the control circuit is too low and the current passing through the TRIAC current element is insufficient, the TRIAC will repeat switching the operating status, and the driving current will not be continuous to blink the LED and further lower the illumination quality.

With reference to FIG. 1 for the circuit diagram and waveform diagram of a conventional LED driver circuit with a holding current, the driver circuit 1 comprises a dimmer 10 which is a TRIAC element, a bridge rectifier 11, a holding switch 12, a holding resistor (RH) 13 and a filter capacitor 14, and the bridge rectifier 11 is coupled to an external power supply through the dimmer 10 to rectify and form an input voltage (Vin) and an input current (Iin). After the filter capacitor 14 receives the input current and converts and forms a driving current (IL), the driving current is supplied to the LED. In addition, the holding switch 12 is a N-Type Metal Oxide Semiconductor Field-Effect Transistor (N-MOSFET) having a drain coupled to the bridge rectifier 11 for receiving an input current, a source coupled to the holding resistor 13, and a gate having a holding voltage (VH), so that the holding resistor 13 receives the holding voltage through the holding switch 12 to output a holding current (Ihold), wherein Ihold= (VH−VGS_N−MOSFET)/RH, and the dimmer 10 is maintained at a stable operating status to improve the dimming accuracy. However, the holding switch 12 and the holding resistor 13 undoubtedly cause a power loss and affect the overall working efficiency of the circuit, and thus resulting in a low power utilization rate and failing to comply with the user requirements of the present electric appliances.

In view of the aforementioned problems of the prior art, the present invention intends to improve the circuit architecture of the conventional driver circuits, so that the driving current is maintained at a constant current while reducing power consumption effectively. To cope with the physical properties of the LED, the simple circuit architecture is employed to achieve the effects of compensating the input voltage, improving the overall operating quality of the circuit, and enhancing the light emitting power of the LED.

SUMMARY OF THE INVENTION

It is a primary objective of the present invention to provide an LED driver circuit for supplying a TRIAC holding current by using a controllable current source, wherein an internal circuit of an IC senses the current value of an overall operating current of the circuit to timely adjust the total current outputted from the controllable current source, so as to assure the operating stability of a TRIAC element while reducing the power consumption and improving the overall circuit efficiency.

To achieve the aforementioned and other objectives, the present invention provides an LED driver circuit for supplying a TRIAC holding current by using a controllable current source which has a single-stage power factor correction circuit architecture and comprises a dimming module, a rectification module, a conversion module and a control module, for driving a plurality of LED light sources to emit light while assuring the operating stability of the dimming module and enhancing the overall circuit power, and the dimming module has a TRIAC element, and the rectification module is electrically coupled to the dimming module and the conversion module, and the conversion module is electrically coupled to the control module and the LED light sources, characterized in that the conversion module uses a controllable current source to receive an input voltage outputted by the rectification module to form a stable operating current; the control module includes a peak detection unit, a cut-off timing unit and a switch unit, and the peak detection unit is electrically coupled to the controllable current source, for detecting the peak value of the input voltage to analyze and form a detection signal; the cut-off timing unit is electrically coupled to the peak detection unit and the switch unit, for sensing a cut-off time of the switch unit, and when the cut-off time reaches a maximum tolerance, a control signal is outputted, and the switch unit enters into a cut-off state according to the received detection signal and enters into a conducting state according to the switching signal, so as to assure that the controllable current source supplies the constant operating current to the LED light sources, while maintaining the operating current always greater than a holding current required by an operation of the TRIAC element when the TRIAC element is conducted.

Since an input voltage does not increase with a current that passes through different LED light sources of different physical properties, a dimming error may occur. Taking this issue into consideration, the control module further includes a high/low voltage compensation unit electrically coupled to the rectification module, the controllable current source and the switch unit for sensing the input voltage to supply a compensation current to the control module, so as to prevent a driving current finally supplied by the controllable current source to the LED light sources from being changed by the input voltage into a non-constant current value and achieve the effects of improving the overall operating quality of the circuit and the light emitting power of the LED.

Wherein, the control module includes a high/low voltage compensation unit electrically coupled to the rectification module, the controllable current source and the switch unit for sensing the input voltage to supply a compensation current to the control module, so as to prevent a driving current finally supplied from the controllable current source to the LED light sources from being changed into a non-constant current value by the input voltage.

Wherein, the conversion module includes a backflow prevention element and a wave filter element, and the backflow prevention element has a terminal coupled to an output terminal of the controllable current source and the other terminal coupled to the wave filter element and the LED light sources to prevent the wave filter element and the LED light sources from affecting the operating stability of the TRIAC element by a voltage source variation produced by a load change; after the wave filter element is coupled to the LED light sources for converting the operating current transmitted from the backflow prevention element to form the driving current with a constant current value, the driving current is transmitted to the LED light sources to enhance a circuit noise resistance. The backflow prevention element is a diode, and the wave filter element is a capacitor, and the controllable current source is an inductor.

In summation of the description above, the present invention comes with a simple circuit structure, and after the peak detection unit of the IC internal circuit detects a peak value of the operating current, and the peak value reaches a default maximum value of the IC or reaches the maximum tolerance of the cut-off time of the switch unit, the operating status of the switch unit is adjusted timely to assure that the driving current supplied to the LED light sources is constant, and the TRIAC element has a sufficient holding current to enhance the dimming accuracy.

DETAILED DESCRIPTION OF THE PREFERRED EMBODIMENTS

The technical content of the present invention will become apparent with the detailed description of preferred embodiments and the illustration of related drawings as follows.

Figure 1:
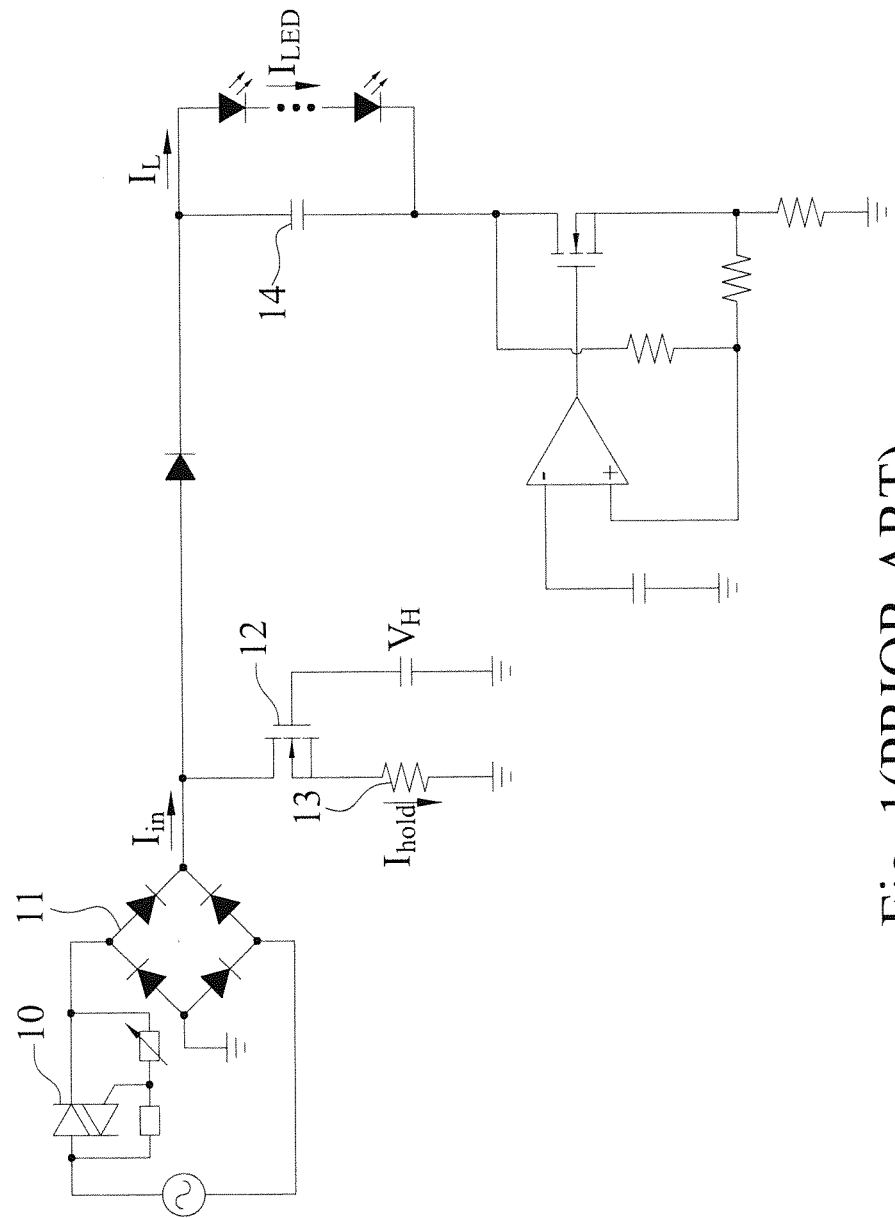
FIG. 1 is a circuit diagram of a conventional LED driver circuit with a holding current.
Figure 2:
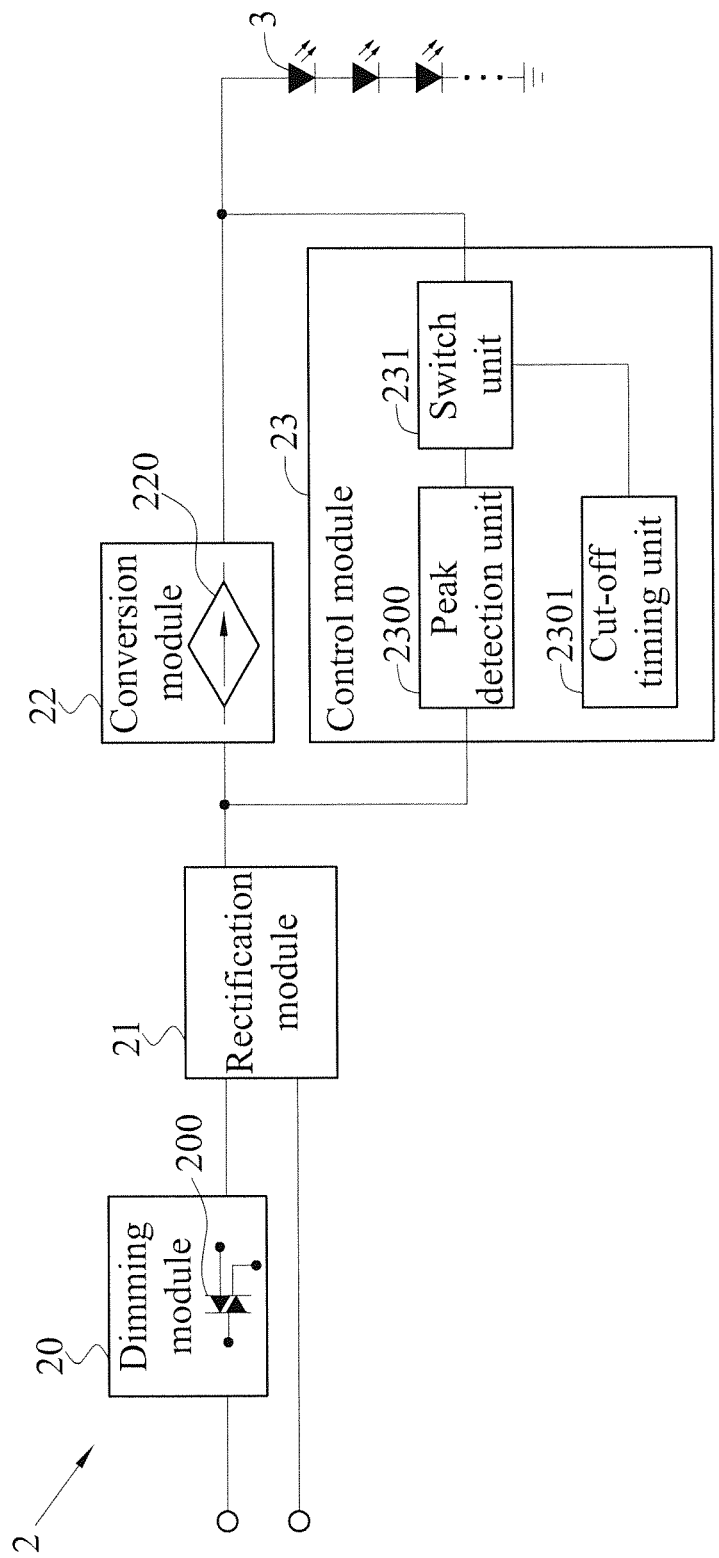
FIG. 2 is a block diagram of a first preferred embodiment of the present invention.
Figure 3:
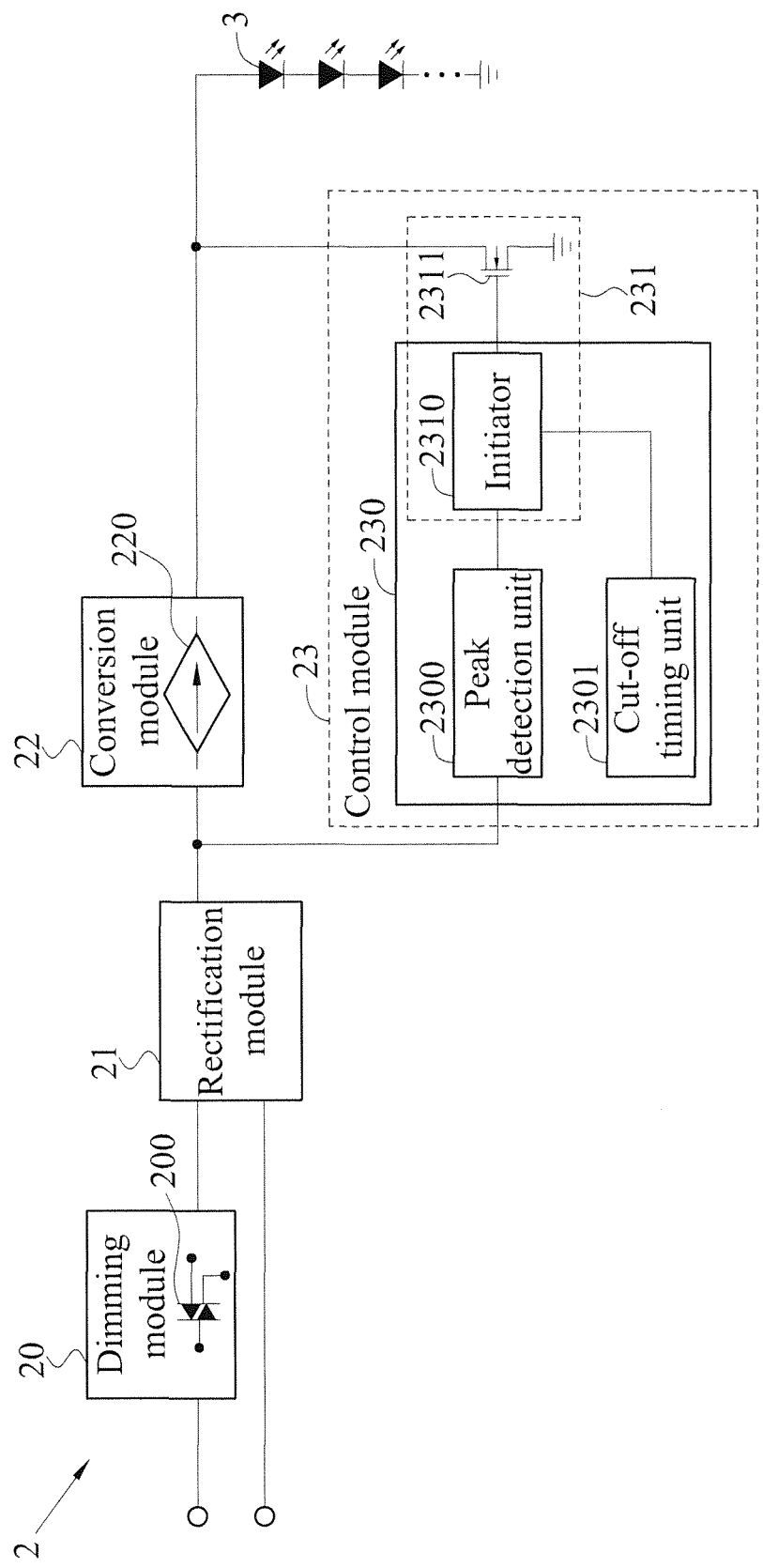
FIG. 3 is a block diagram of a second preferred embodiment of the present invention.
Figure 4:
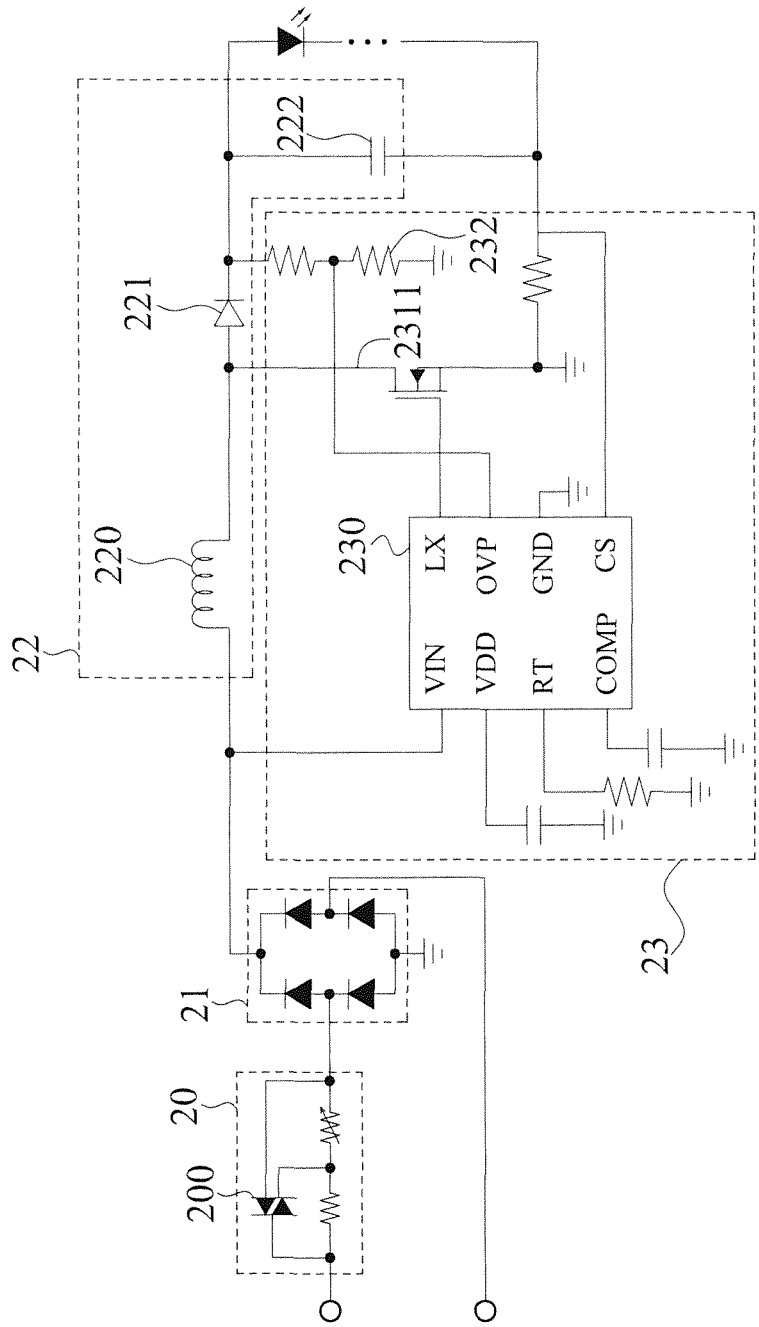
FIG. 4 is a circuit diagram of a third preferred embodiment of the present invention.

With reference to FIGS. 2 to 4 for block diagrams of the first and second preferred embodiment and a circuit diagram of the third preferred embodiment of the present invention respectively, an LED driver circuit for supplying a triode for alternating current (TRIAC) holding current by using a controllable current source 2 (being a single-stage power factor correction circuit architecture and having a dimming module) comprises a dimming module 20, a rectification module 21, a conversion module 22 and a control module 23, wherein the conversion module 22 is electrically coupled to an external power supply (not shown in the figure) through the rectification module 21 and the dimming module 20, and also electrically coupled to the control module 23 and a plurality of LED light sources 3 to cut off the electric power of the external power supply to form an operating current (IO) to drive the LED light sources 3 to operate, while assuring the operating stability of the dimming module 20 and enhancing the power of the overall circuit.

The dimming module 20 includes a TRIAC element 200 and is electrically coupled to the external power supply through the TRIAC element 200, and the rectification unit 21 is a bridge rectifier circuit and has an input terminal electrically coupled to the TRIAC element 200. After the TRIAC element 200 adjusts a phase conduction angle of the external current with an AC voltage, the bridge rectifier circuit rectifies and forms an input voltage (Vin). The conversion module 22 is comprised of a controllable current source 220 which is an inductor, a backflow prevention element 221 which is a diode, and a wave filter element 222 which is a capacitor, and the controllable current source 220 has a terminal electrically coupled to an output terminal of the bridge rectifier circuit and the other terminal electrically coupled to an anode of the backflow prevention element 221, and a cathode of the backflow prevention element 221 is electrically coupled to the wave filter element 222 and the LED light sources 3, and the wave filter element 222 receives the LED light sources. The controllable current source 220 receives the input voltage to store energy to form the stable operating current. After the backflow prevention element 221 outputs the operating current, the wave filter element 222 converts the operating current transmitted from the backflow prevention element 221 into a driving current with a constant current value to the LED light sources 3, so as to enhance a circuit noise resistance. It is noteworthy that the isolation provided by the backflow prevention element 221 prevents the TRIAC element 200 from being affected by the wave filter element 222 and the LED light sources 3 due to a voltage source variation produced by a load change, so as to assure the operating stability.

The control module 23 is comprised of a control chip 230 and a switch unit 231, and the control chip 230 has at least 8 pins including VIN, VDD, RT, COMP, OUT, OVP, GND and CS; and a peak detection unit 2300 and a cut-off timing unit 2301 are installed in the control module 23. The cut-off timing unit 2301 is electrically coupled to the peak detection unit 2300, and the switch unit 231 has an initiator 2310 and a regulating switch 2311 which is a N-MOSFET, and the initiator 2310 is an internal circuit of the control chip 230 and electrically coupled to the peak detection unit 2300, the cut-off timing unit 2301 and a gate of the N-MOSFET, and the regulating switch 2311 is a transistor externally coupled to the control chip 230 or a built-in circuit of the control chip 230, and a drain of the regulating switch 2311 is electrically coupled to an output terminal of the controllable current source 220. The VIN pin of the control chip is electrically coupled to an input terminal of the controllable current source 220 to cut off the input voltage and converts and forms an operating power required by the internal circuit of the chip, and the peak detection unit 2300 may be a comparator electrically coupled to an input terminal of the controllable current source 220 for detecting a peak value of the input voltage. When the input voltage peak value reaches the default maximum value of the IC, a detection signal is generated and provided for switching the regulating switch 2311 to enter into the cut-off state through the initiator 2310.

In the meantime, the cut-off timing unit 2301 senses a cut-off time of the N-MOSFET when the peak detection unit 2300 outputs the detection signal. When the cut-off time reaches a maximum tolerance, a control signal is generated to trigger the initiator 2310 to switch the regulating switch 2311 into a conducting state. The constant cut-off time of the N-MOSFET prevents the controllable current source 220 from being affected by the actual waveform frequency of the input voltage to achieve the effect of outputting the constant operating current while assuring the operating current always greater than a holding current required by an operation of the TRIAC element 200 when the TRIAC element 200 is conducted, so as to enhance the dimming quality.

Figure 5:
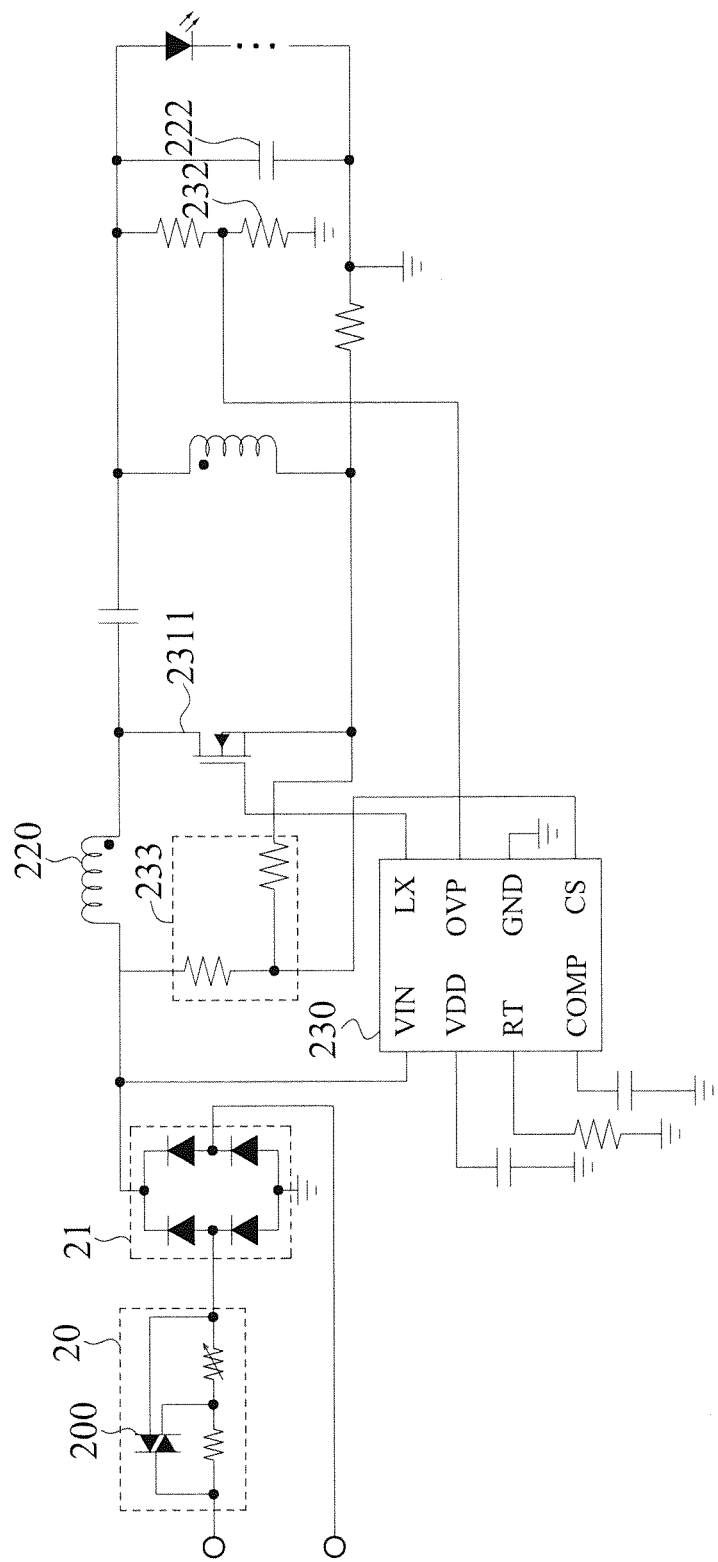
FIG. 5 is a circuit diagram of a fourth preferred embodiment of the present invention.

In this preferred embodiment, the control chip 230 is electrically coupled to a protective resistor 232 through the OVP pin, and the protective resistor 232 is electrically coupled to a cathode of the backflow prevention element 221 for receiving an operating current passing through the backflow prevention element 221 to divide the voltage at both terminals to produce a voltage drop value, so that if the voltage drop value is greater than a default safety value of the IC, the control chip 230 will stop the operation to prevent damages of the overall circuit caused by a possible abnormal operation of the controllable current source 220. In addition, the control module 23 further includes a high/low voltage compensation unit 233 as shown in FIG. 5, and the high/low voltage compensation unit 233 is comprised of two resistors and has a terminal electrically coupled to an output terminal of the bridge rectifier circuit and an input terminal of the controllable current source 220, and the other terminal electrically coupled to a source of the N-MOSFET, wherein a CS pin is electrically coupled to the control chip 230 at the serial connection between the two resistors, and the high/low voltage compensation unit 233 is for sensing the input voltage to supply a compensation current to the control chip 230 to prevent the driving current finally supplied to the LED light sources 3 from being changed into a non-constant current value by the variation of the input voltage.

What is claimed is:

1. An LED driver circuit for supplying a TRIAC holding current by using a controllable current source, being a single-stage power factor correction circuit architecture, comprising:
   a dimming module;
   a rectification module;
   a conversion module; and
   a control module, comprising a control chip,
   wherein the dimming module comprises a TRIAC element, and the rectification module is electrically coupled to the dimming module and the conversion module, and the conversion module is electrically coupled to the control module and a plurality of LED light sources wherein, the conversion module receives an input voltage outputted by the rectification module to form a stable operating current via a controllable current source, an end of the controllable current source is couple to the rectification module, an another end of the controllable current source is directly couple to a terminal of the control module and a terminal of a regulating switch; wherein a gate of the regulating switch is connected to the control chip, the control module includes a peak detection unit, a cut-off timing unit and a switch unit, and the peak detection unit is electrically coupled to the controllable current source, for detecting the peak value of the input voltage to analyze and form a detection signal; the cut-off timing unit is electrically coupled to the peak detection unit and the switch unit, for sensing a cut-off time of the switch unit, and when the cut-off time reaches a maximum tolerance, a control signal is outputted, and the switch unit enters into a cut-off state according to the received detection signal and enters into a conducting state according to the switching signal, so that the controllable current source supplies the constant operating current to the LED light sources, while maintaining the operating current always greater than a holding current required by an operation of the TRIAC element when the TRIAC element is conducted.

2. The LED driver circuit for supplying a TRIAC holding current by using a controllable current source according to claim 1, wherein the control module includes a high/low voltage compensation unit electrically coupled to the rectification module, the controllable current source and the switch unit for sensing the input voltage to supply a compensation current to the control module, so as to prevent a driving current finally supplied from the controllable current source to the LED light sources from being changed into a non-constant current value by the input voltage.

3. The LED driver circuit for supplying a TRIAC holding current by using a controllable current source according to claim 2, wherein the conversion module includes a backflow prevention element and a wave filter element, and the backflow prevention element has a terminal coupled to an output terminal of the controllable current source and an another terminal coupled to the wave filter element and the LED light sources to prevent the wave filter element and the LED light sources from affecting the operating stability of the TRIAC element by a voltage source variation produced by a load change; after the wave filter element is coupled to the LED light sources for converting the operating current transmitted from the backflow prevention element to form the driving current with a constant current value, the driving current is transmitted to the LED light sources to enhance a circuit noise resistance.

4. The LED driver circuit for supplying a TRIAC holding current by using a controllable current source according to claim 3, wherein the backflow prevention element is a diode and the wave filter element is a capacitor.

5. The LED driver circuit for supplying a TRIAC holding current by using a controllable current source according to claim 4, wherein the controllable current source is an inductor.

* * * * *